Oct. 23, 1956

A. MATHISEN 2,768,261

EXPLOSION PROTECTION SYSTEMS AND APPARATUS THEREFOR

Filed Feb. 2, 1954

INVENTOR
Anders Mathisen

BY Mason, Mason & Sheridan
ATTORNEYS

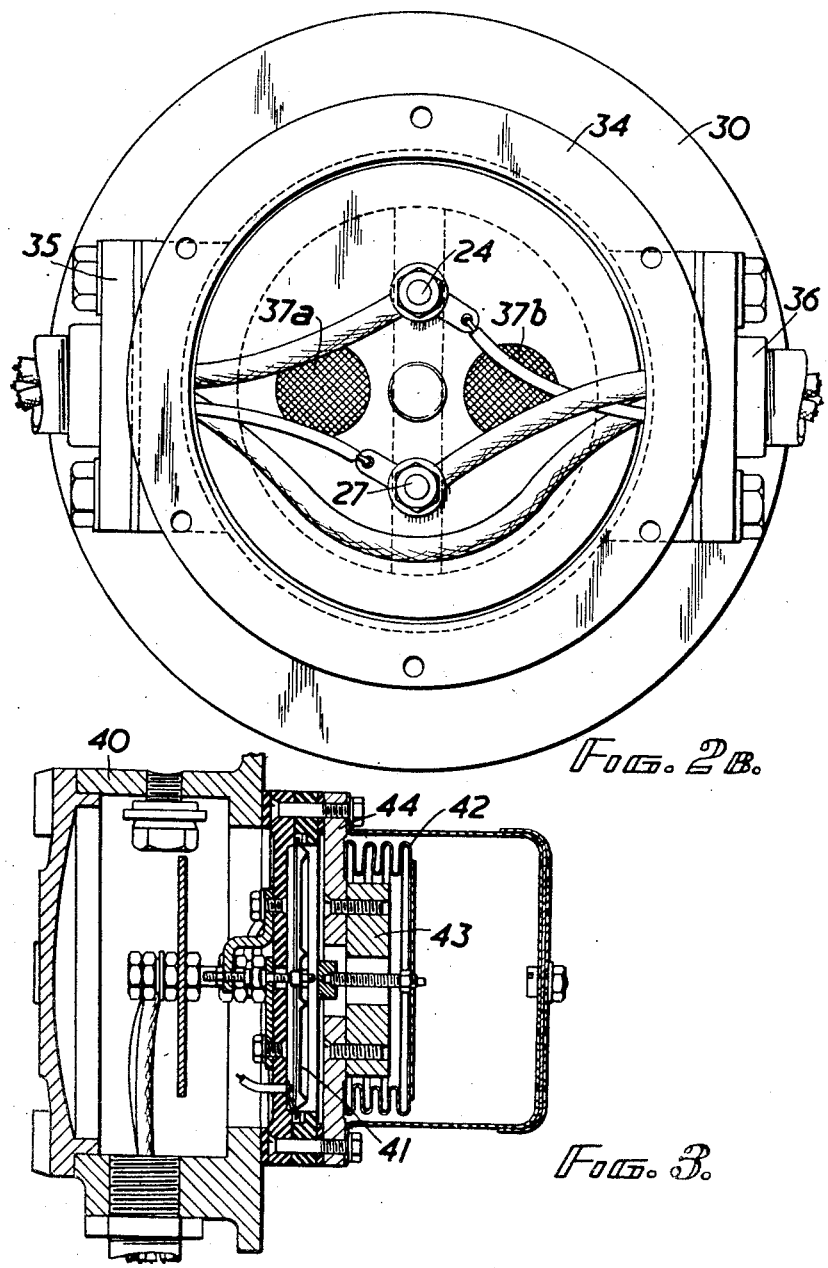

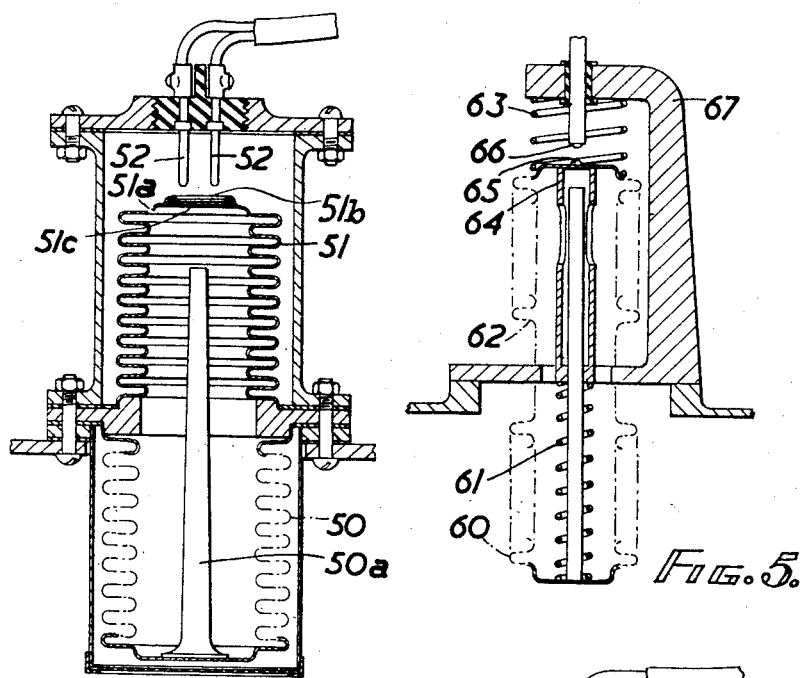
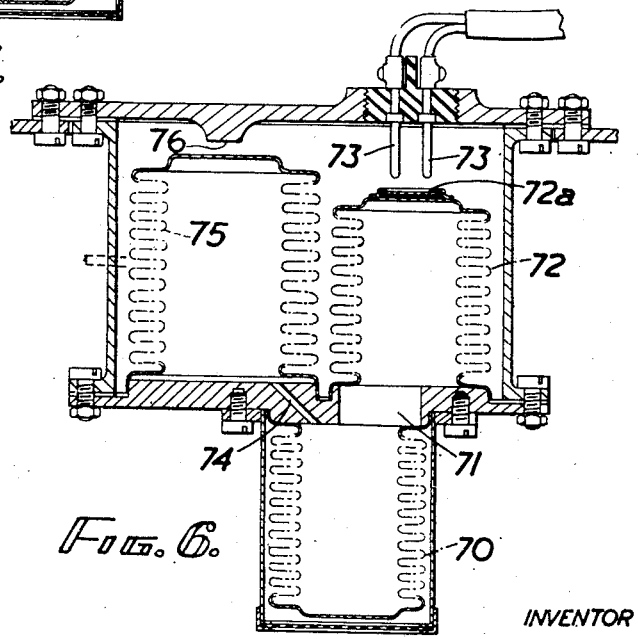

United States Patent Office 2,768,261
Patented Oct. 23, 1956

2,768,261

EXPLOSION PROTECTION SYSTEMS AND APPARATUS THEREFOR

Anders Mathisen, London, England, assignor of one-half to Graviner Manufacturing Company Limited, and one-half to The Wilkinson Sword Company Limited, London, England, both British companies Application February 2, 1954, Serial No. 407,671

Claims priority, application Great Britain February 4, 1953

19 Claims. (Cl. 200—83)

This invention relates to explosion protection systems and to apparatus for use in such systems, particularly improved forms of apparatus of the kind described and claimed in my prior co-pending application Serial No. 282,243 filed April 14, 1952, now Patent No. 2,701,827, which issued on Feburary 8, 1955. In British Patent No. 643,188 there is described one known form of such apparatus which is adapted to detect incipient explosions by detecting a rise in pressure whose rate of rise exceeds a predetermined value, the apparatus thereupon effecting operation of suppressant distributors for suppressing the explosion.

Whilst such detecting apparatus has proved very satisfactory for many purposes, difficulties arise in the case of so called "slow" explosions, when there is an explosive mixture the proportions of which are such that the mixture is far from ideal, i. e. is almost too rich or too weak to be explosive.

With such "slow" explosions the rate of rise of pressure may be comparable with variations of pressure normally occurring in the apparatus to be protected, such variations being due, for example, to pumping apparatus in the case of gas manufacturing plants or due to extractors in dust extracting plants or due to simulated altitude pressures in the case of chambers used for testing aircraft fuels. It will be apparent that the minimum rate of rise of pressure to which the detecting apparatus is set to respond must be appreciably above the normally occurring rates, and the apparatus then fails to detect slow explosions.

These difficulties may be overcome, in accordance with the present invention, by providing an explosion protection system comprising first pressure responsive means adapted to respond to the onset of a predetermined pressure, further pressure responsive means adapted to respond to a rate of rise of pressure in excess of a predetermined rate, and means for suppressing, relieving or diverting an incipient explosion which is operative by said first and further pressure responsive means respectively upon the onset of a predetermined pressure or upon a rise in pressure exceeding said predetermined rate.

In such a system the first pressure responsive means detects the fast explosions, whilst the further pressure responsive means detects the slow explosions whose rate of rise of pressure is not sufficiently great to be detected by the first means. The first means must be provided for detecting the faster explosions as with such explosions it is not possible to wait until the pressure has risen sufficiently to operate the further means. This is because, the rate of rise of pressure becomes higher with increasing time, and therefore with a "fast" explosion the rate of rise would be so high before the second means operated that suppression would not then be effected in time to prevent damage.

For use in explosion suppression systems the invention may provide apparatus for explosion protection comprising means adapted to effect a desired operation when exposed to a pressure rising at a rate exceeding a predetermined amount, and further means adapted to effect the same operation when exposed to a pressure which exceeds a predetermined value, and irrespective of the rate of rise of the pressure.

The invention may further provide apparatus for explosion protection comprising a diaphragm adapted to make a predetermined movement when subjected to a pressure rising at a rate exceeding a specified value, and means responsive to the onset of a specified pressure for effecting the same predetermined movement of said diaphragm when said pressure is attained.

Whilst the means solely responsive to rates of rise of pressure exceeding a predetermined value and the means solely responsive to the onset of a predetermined pressure may be quite separate pieces of apparatus preferably they are combined in a single apparatus. Such apparatus may comprise a first diaphragm one surface of which is exposed to the pressure in said confined space, a second diaphragm, said first and second diaphragms being arranged to complete a fluid chamber with said one surface on the outside of said chamber, means for performing a desired operation which is adapted to be actuated by movement of said second diaphragm, a restricted orifice in the walls of said chamber adapted to allow escape of fluid therefrom at a limited rate, and means for transmitting a predetermined movement of said first diaphragm to said second diaphragm to effect movement thereof, the arrangement being such that if the pressure in said confined space rises at a rate in excess of said predetermined rate said orifice is insufficient to prevent the pressure within said fluid chamber rising to a value sufficient to cause movement of said second diaphragm, whilst a rise of pressure in said confined space which causes said predetermined movement of the first diaphragm will also cause movement of said second diaphragm.

Where a separate pressure rate of rise detector and pressure detector are used, each may be of known kind. The two separate detectors will then be arranged so that operation of either actuates explosion suppressing, relieving and/or diverting means. The suppressing means may comprise hemispherical or like suppressant distributors of known kind, or appliances having a wide-bore discharge orifice. Operation of either detector may also, or alternatively, operate explosion relieving or diverting means.

Preferably, however, the two pressure responsive means are combined in a single apparatus, and several embodiments of such apparatus will now be described with reference to the accompanying drawings in which:

Fig. 2b is a rear view in the direction of the arrow II b in Fig. 2a;

Fig. 3 is a sectional side elevation of a third form of detector according to the invention, and Figs. 4, 5, and 6 are similar views of two further possible constructions of detector.

Figure 1:
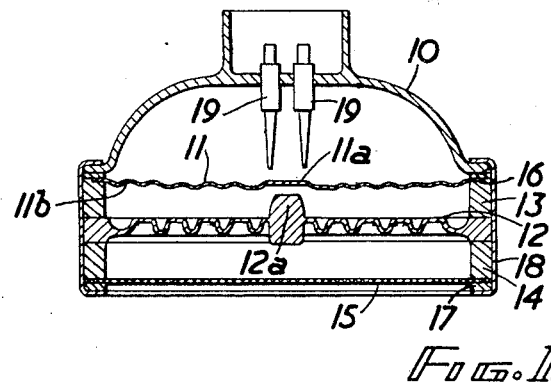
Fig. 1 is a somewhat diagrammatic view in sectional side elevation of one form of combined detector according to the invention.

Referring now to Fig. 1, this shows a bell-shaped housing 10 to the mouth of which a thin diaphragm 11 of the kind commonly used in barometers is secured. A further flexible diaphragm 12 is spaced apart from the diaphragm 11 by a spacing ring 13, and in front of a further spacing ring 14 a gas permeable membrane 15 is mounted. Together with washers 16, 17, these parts are secured to the mouth of the housing 10 by a clamping ring 18. Two electrical contacts 19 project through the top of the housing 10 and their ends terminate near a contact plate 11a carried by the diaphragm 11. The diaphragm 12 carries a boss 12a which projects towards the contact plate 11a. The diaphragm 11 is provided with a restricted orifice 11b so that the diaphragm only moves when subjected to a pressure whose rate of rise exceeds the value which can be neutralised by the orifice, say 5 pounds per square inch per second.

The detector is mounted on a zone which it is desired to protect from explosion so that changes of fluid pressure within the zone are transmitted through the permeable membrane 15 to the diaphragm 12. If the pressure changes at less than the selected rate of rise, the diaphragm 12 will move towards the contacts 19, but the diaphragm 11 will remain stationary due to neutralisation by the orifice 11b. Eventually, at some predetermined pressure, the boss 12a will engage the contact plate 11a and move it into engagement with the contacts 19, thereby completing the electric circuit. On the other hand, if the pressure changes at a rate exceeding the aforesaid rate of rise, the diaphragm 11 will move towards the contacts 19 and the contact plate 11a will complete the circuit in the same manner. In this way the detector will be able to detect both "fast" and "slow" explosions.

Figure 2A:
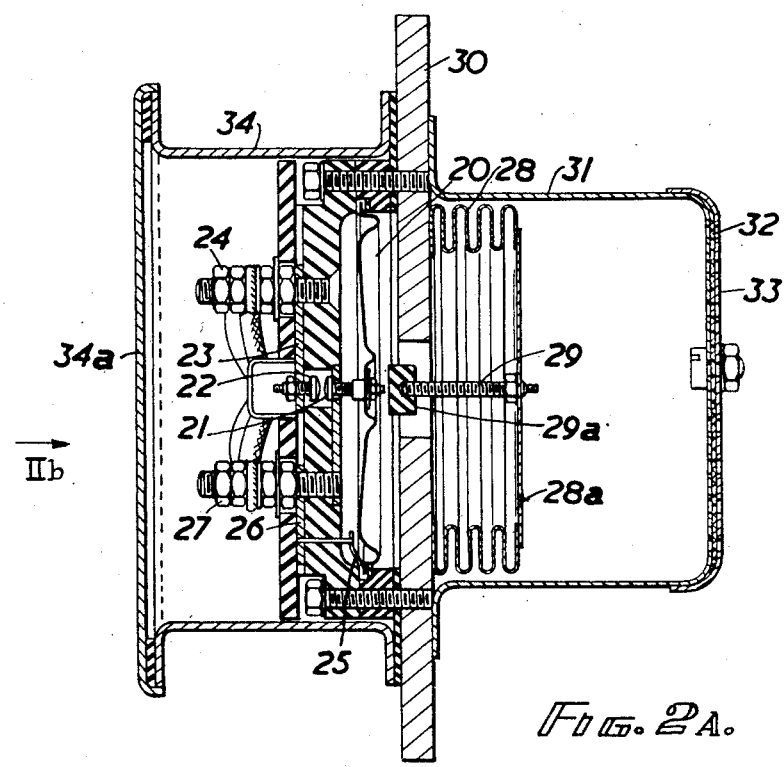
Fig. 2a is a sectional side elevation of a further form of detector, whilst

Referring now to Figs. 2a and 2b, these show a practical form of detector operating on the same principle as that shown in Fig. 1. In this construction the inner diaphragm 20 is of the snap-action type and is arranged to snap over when the difference in pressure on opposite sides of the diaphragm 20 reaches a specified value. The diaphragm 20 carries one contact member 21 which co-operates with a fixed contact member 22 connected via a conductive strip 23 to one terminal 24 of the detector. The diaphragm 20 is connected by a wire 25 and conductive strip 26 to the other terminal 27 of the diaphragm.

The outer diaphragm 28 is in the form of a corrugated bellows, the end plate 28a of which carries a projecting stud 29 to the end of which an insulating block 29a is secured. The detector elements are assembled on a mounting plate 30 and on one side of this a cover 31 is secured for protecting the bellows 28 against mechanical damage. The front plate of the cover 31 is apertured and a nylon or like filter 32 is secured across its face by a clamping cap 33. A housing 34 is secured to the rear of the mounting plate 30, a removable cover 34a being provided for giving access to the terminals 24, 27. Conduit connections 35, 36 are provided on opposite sides of the housing 34 to admit connections to the terminals 24, 27, it being desirable to provide both entry and exit conduits as two or more detectors may be connected in series or in parallel, and it may also be necessary to provide connections to a monitoring circuit.

The space at the rear of the diaphragm 20 communicates with the interior of the housing 34 through two apertures 37a, 37b which are provided in the insulated terminal block, the apertures being covered by filter material.

An orifice (not shown) is provided in the diaphragm 20 so that normally this diaphragm will only move when the pressure applied to the bellows 28 rises at a rate in excess of a predetermined rate. On the other hand, if the pressure rises slowly, the bellows 28 will collapse slowly until, at a predetermined pressure, the block 29a will engage the adjacent end of the contact 21 and cause the diaphragm 20 to snap over, thereby closing the contacts 21, 22. The pressure at which this occurs may be as little as 0.5 pound per square inch above the normal pressure.

As the interior of the housing 34 is in free communication with the interior of the conduits which are connected at 35 and 36, the rear of the diaphragm 20 is to all intents and purposes in virtually free communication with the atmosphere, and there is what may be described as an infinite back-volume on this side of the diaphragm. The advantage of having such a back-volume is that the movement of the diaphragm 20 is not opposed by compression of gas which would otherwise tend to reduce the sensitivity of the detector.

Fig. 3 shows a further form of construction which is generally similar to that shown in Figs. 2a and 2b, but differs in details of mechanical construction. In particular, the housing 40 is designed to be weatherproof and is in the form of a casting. A further feature is that an annular plug 43 is secured to the mounting flange 44 to reduce the volume of gas in the space between the diaphragm 41 and the bellows 42.

Fig. 4 shows a further construction working on similar lines to those already described except that both pressure sensitive members 50, 51 are in the form of corrugated bellows. A restricted orifice 51a is provided in the bellows 51 which carries a contact plate 51b adapted to engage two fixed contacts 52. The bellows 50 carries a stem 50a which moves into engagement with an insulated member 51c at the rear of the contact plate 51 upon the onset of a predetermined pressure so that the contact plate 51b moves into engagement with the fixed contacts 52.

The bellows 50 must be sufficiently strong to withstand the pressure existing just prior to detection of a "slow" explosion, but must be flexible enough to give the necessary movement of the stem 50a. On the other hand, bellows 51 must be very flexible in order to give high sensitivity for detection of "fast" explosions.

In order to increase the stiffness of the bellows 50, particularly in cases where the ambient pressure in the space to be protected is appreciably in excess of atmospheric pressure, and to prevent excessive collapse of the bellows, it may be reinforced by a spring opposing the ambient pressure. Thus, for example, the construction shown in Fig. 3 may be modified by making the plug 43 of somewhat smaller diameter in order to provide a locating surface for a helical spring, one end of which bears against the flange 44 whilst the other end bears against the end plate of the bellows 42. It will be understood that the strength of the spring must be such that the bellows 42 collapses progressively with increasing pressure until the predetermined pressure at which operation is required is attained.

The same principle is used in the construction shown in Fig. 5, where the bellows 60 is reinforced by a spring 61. At the same time, to damp natural vibration of the bellows 62 a light spring 63 forces the bellows 62 against a stop 64. With a suitably light spring there is only a slight loss of sensitivity. In this case, one contact 65 is carried by the bellows 62 whilst the other 66 is adjustably mounted on a support 67.

As the restricted orifice may be very small and therefore easily blocked with foreign matter or by ice formation, the constructions shown in Figs. 4 and 5 may be modified by arranging that the restricted orifice opens into a third bellows which is made very flexible compared with the other bellows to avoid appreciable reduction of sensitivity.

Under certain conditions the space to be protected may be subjected to wide variations of pressure, for example where the normal pressure is above atmospheric pressure, but during a process the pressure is periodically reduced to atmospheric pressure, or alternatively, where the space is normally maintained at sub-atmospheric pressure, but the pressure is periodically raised to atmospheric pressure. Under such conditions difficulties may arise with gas-filled detectors as the sudden change of pressure may cause inadvertent operation of the device and, furthermore, the expansion or contraction of the gas within the detectors would call for special features of construction. These difficulties may be overcome by filling the space between the two diaphragms or bellows with a liquid. However, it is necessary to retain the liquid which passes out of the restricted orifice, and for this purpose, as shown in Fig. 6 and as referred to above for the modified arrangement of Figs. 3 and 4, a third bellows is provided. In this construction a bellows 70 is exposed to the pressure in the space to be protected and communicates through a rear opening 71 with a bellows 72 which carries a contact plate 72a. It also communicates through a restricted orifice 74 with a bellows 75 whose flexibility is considerably greater than that of the bellows 72. All the bellows are filled with liquid; silicone fluids are suitable for this purpose not only because of their low viscosity but also because of their small changes of viscosity with temperature.

When the pressure changes slowly the bellows 70 collapses slowly and liquid passes through the orifice 74 causing expansion of the bellows 75 until such time as its end comes into contact with the stop 76. During this time there is little movement of bellows 72 because of its greater stiffness. Further collapse of the bellows 70 causes expansion of bellows 72 until, at the predetermined pressure, the contact plate 72a engages contacts 73 and completes the circuit. If, however, the pressure rises at a rate exceeding a predetermined rate, the liquid cannot flow sufficiently quickly through the orifice 74 and the bellows 72 then expands to complete the circuit. Such a detector is particularly adapted for use in conditions where the space to be protected contains liquid, as it may be submerged in the liquid.

As an alternative to using two bellows of different strength the construction shown in Fig. 6 may be modified by arranging that the bellows 72 and 75 are similar and that bellows 75 carries a pair of normally open contacts, the lower one of which can be engaged by a stud provided on the top of the bellows 72 to move it into engagement with the upper contact. The operation of this modified detector is that when the pressure rises slowly both bellows expand quickly and the stud does not engage the lower contact. However, if the pressure rises by a predetermined extent the movement of the bellows 75 is arranged to bring the upper contact into engagement with a fixed stud so that on further movement the lower contact is brought into engagement with the upper contact. On the other hand, when the pressure rise exceeds the rate of rise, the bellows carrying the contacts cannot expand so quickly as the other bellows due to the restricted orifice, and the stud on the latter then moves the lower contact into engagement with the upper contact to complete the circuit.

Where there are wide variations in the normal pressure in the space to be protected, for example in the case of altitude fuel test chambers already referred to where the normal pressure may vary from one to fifteen pounds per square inch absolute or higher, another modification of the Fig. 6 construction is particularly useful. This modification consists of providing a restricted orifice in the wall of the enclosure surrounding the bellows 72 and 75, as indicated by the broken lines at 76, so that normal slow variations in the space to be protected are transmitted to the enclosure. However, because of the small size of the orifice 76 compared with the volume of the enclosure even slow explosions can be detected without fear of equalising the pressure through the orifice.

In order to prevent inadvertent operation of detectors, which may occur, for example due to vibration, or in certain installations where the space to be protected contains liquid which may move about in the space and impart shocks to the detectors similar to an exposive rate of rise, it may be desirable to use a plurality of detectors, or a plurality of each kind of detector where separate pressure and rate-of-pressure-rise detectors are used. The contacts of the detectors are then connected in series so that operation of both must occur before completion of the circuit performing the desired operation. In this way the chances of inadvertent operation are reduced whilst if an explosion should occur both or all the detectors will operate to complete the circuit.

What I claim is:

1. In apparatus for detecting an abnormal rise in pressure in a confined space subject to incipient explosions and for detecting a rise in pressure at an abnormal rate due to an incipient explosion in said confined space, a first pressure responsive element, one side of which is exposed to the pressure in said confined space, a second pressure responsive element spaced from said first pressure responsive element to form a fluid chamber on the opposite side of said first element to said confined space, said second element moving a predetermined amount when the difference between the pressures on opposite sides of the second element exceeds a predetermined value, a restricted orifice permitting a limited flow of fluid from said chamber for maintaining the pressure between opposite sides of the second element below said predetermined value except when the pressure applied to said first element rises at an abnormal rate as a result of an incipient explosion in said confined space, and means for effecting movement of said second element by said predetermined amount when an abnormal pressure is applied to said first element.

2. Apparatus according to claim 1, in which said first pressure responsive element is reinforced by spring means for resisting ambient pressures appreciably in excess of atmosphere pressure.

3. Apparatus for protection against explosions liable to occur in a confined space, comprising a first diaphragm one surface of which is exposed to the pressure in said confined space, a second diaphragm, said first and second diaphragms constituting walls of a fluid chamber having said one surface on the outside of said chamber, electric circuit closure means actuated by movement of said second diaphragm, a restricted orifice in one of the walls of said chamber adapted to allow escape of fluid therefrom at a limited rate whereby if the pressure in said confined space rises at an abnormal rate due to an incipient explosion, said orifice is insufficient to prevent the pressure within said fluid chamber rising to a value sufficient to cause movement of said second diaphragm, and a stud mounted on said first diaphragm and extending towards said second diaphragm, an abnormal rise in the pressure in said confined space due to an incipient explosion bringing said stud into engagement with said second diaphragm and effecting movement thereof.

4. Apparatus according to claim 3, in which said electric circuit closure means comprises an electric contact carried by said second diaphragm, and a further electric contact mounted adjacent said first contact and normally spaced apart therefrom.

5. Apparatus according to claim 3, in which said second diaphragm is a snap-action diaphragm.

6. Apparatus according to claim 3, in which said first diaphragm comprises a bellows device.

7. Apparatus according to claim 6, wherein gas permeable filter means is provided adjacent said bellows.

8. Apparatus for detecting abnormal rises in pressure in a confined space and for detecting rises in pressure which occur at an abnormal rate in said space, comprising a casting, a first diaphragm secured to said casing and having one surface subject to the pressure in said space, a second diaphragm mounted within said casing on the opposite side of said first diaphragm to said space and spaced from said first diaphragm whereby said first and second diaphragms form walls of a fluid chamber isolated from said confined space, a restricted orifice in one of said walls for allowing the escape of fluid from said chamber when the pressure applied to said one surface of said first diaphragm increases at less than an abnormal rate, and means for effecting movement of said second diaphragm in response to a predetermined movement of said first diaphragm towards said second diaphragm resulting from the application of an abnormal pressure to said one surface of said first diaphragm.

9. Apparatus according to claim 8, which further comprises a first electrical contact mounted on said second diaphragm on the side of said second diaphragm which is remote from said first diaphragm, and a second electrical contact mounted adjacent said first contact but normally spaced apart therefrom, movement of said second diaphragm which results from an abnormal rise in pressure in said confined space or from a rise in pressure which occurs at an abnormal rate bringing said first contact into engagement with said second contact.

10. Apparatus according to claim 8, in which said orifice communicates with a further fluid chamber.

11. Apparatus according to claim 10, in which part at least of said further fluid chamber comprises a diaphragm whose flexibility is appreciably greater than that of said second diaphragm.

12. Apparatus according to claim 11 in which the first and further fluid chambers are filled with liquid.

13. Apparatus for detecting abnormal rises in pressure, said apparatus comprising, in combination, a housing, a spacing member extending across said housing between the ends thereof, a movable pressure rate of rise responsive element fitted in said housing on one side of said spacing member, a flexible wall extending across said housing on the other side of said spacing member, said pressure element and said flexible wall being spaced somewhat from said spacing member so as to form a fluid chamber between the inner side of said pressure element and the inner side of said flexible wall, a first electrical contact mounted on said pressure element, a second electrical contact fixed relative to said housing adjacent said first electrical contact, said pressure element being biased to a position in which said electrical contacts are spaced apart, said flexible wall moving towards said pressure responsive element in response to increases in pressure in the surrounding medium to transmit abnormal rates of rise of pressure to said pressure rise responsive element thereby overcoming the bias and closing said electrical contacts, and a stud centrally mounted on said flexible wall and facing towards said pressure element, substantial movement of said flexible wall towards said pressure responsoive element bringing said stud into engagement with said pressure element and overcoming said bias to close said electrical contacts.

14. Apparatus for detecting abnormal rises in pressure in a confined space, said apparatus comprising a housing, a pressure rate of rise responsive element extending across said housing providing a fluid chamber on one side of said element, a movable wall extending across said housing and spaced from said element on the other side thereof and providing a second fluid chamber in said housing between said element and said wall, the side of said movable wall remote from said pressure rate of rise responsive element being exposed to variations of pressure in said confined space whereby said pressure variations are communicated by said movable wall to the fluid medium within the second fluid chamber, said element having a restricted orifice for allowing a restricted flow of fluid out of said second fluid chamber whereby pressure variations applied to said movable wall only actuate said pressure rate of rise responsive element when said pressure variations involve abnormal rates of rise, and a stud mounted on said movable wall and projecting towards said element whereby a predetermined movement of said movable wall resulting from an increase in pressure in said confined space brings said stud into engagement with said pressure rate of rise element to effect actuation thereof.

15. Apparatus according to claim 14, in which said pressure rate of rise responsive element comprises a diaphragm of the snap action type.

16. Apparatus according to claim 14, in which said movable wall comprises a corrugated bellows.

17. Apparatus for detecting both abnormal rises in pressure and also rises in pressure which occur at an abnormal rate, comprising a cylindrical housing, an expansible diaphragm extending transversely across said housing, a further diaphragm extending transversely across said housing and spaced from said expansible diaphragm whereby a fluid chamber is formed within said housing between said expansible diaphragm and said further diaphragm, said further diaphragm having a restricted orifice formed therein whereby fluid can pass from one side of said further diaphragm to the other side at a restricted rate, a first electrical contact mounted on said further diaphragm on the side of said further diaphragm which is remote from said expansible diaphragm, a second electrical contact mounted adjacent said first contact, and a projecting stud mounted on said expansible diaphragm and projecting into said fluid chamber.

18. Apparatus according to claim 17, further comprising spring means engaging said expansible diaphragm, said spring means opposing movement of said expansible diaphragm towards said further diaphragm.

19. Apparatus for detecting abnormal rises in pressure due to an explosion in a confined space and for detecting rises in pressure which occur at an abnormal rate due to an explosion in said space, said apparatus comprising a housing, a first expansible diaphragm sealed across said housing and having one surface in unrestricted fluid communication with said confined space, said first diaphragm being expansible in response to variations in pressure in said confined space, a pressure responsive element disposed within said housing in spaced-relation to said expansible diaphragm and dividing the interior of said housing into two fluid containing chambers both isolated from said confined space, restrictive orifice means establishing communication between said two chambers to permit substantially immediate equalization of fluid pressure therebetween and thereby normally to prevent movement of said pressure responsive element with movement of said expansible diaphragm when the rate of pressure rise in said confined space causing said movement does not exceed a predetermined limit, and a stud mounted on said expansible diaphragm and movable with said diaphragm to engage said pressure responsive element and effect movement thereof when the pressure in said confined space rises by an abnormal extent.

References Cited in the file of this patent

UNITED STATES PATENTS

| | | |
|---|---|---|
| 2,091,300 | Bassett et al. | Aug. 31, 1937 |
| 2,267,541 | Van Houten | Dec. 23, 1941 |
| 2,445,335 | Philbrick et al. | July 20, 1948 |
| 2,632,474 | Jones | Mar. 24, 1953 |
| 2,637,999 | Klebba | May 12, 1953 |

FOREIGN PATENTS

| | | |
|---|---|---|
| 221,504 | Great Britain | May 14, 1925 |
| 644,641 | France | June 12, 1928 |